(12) United States Patent
Papageorgiou

(10) Patent No.: US 7,333,107 B2
(45) Date of Patent: Feb. 19, 2008

(54) VOLUME RENDERING APPARATUS AND PROCESS

(75) Inventor: Pavlos Papageorgiou, Edinburgh (GB)

(73) Assignee: Voxar Limited, Edinburgh (GB)

( * ) Notice: Subject to any disclaimer, the term of this patent is extended or adjusted under 35 U.S.C. 154(b) by 225 days.

(21) Appl. No.: 11/206,348

(22) Filed: Aug. 18, 2005

(65) Prior Publication Data

US 2007/0040830 A1  Feb. 22, 2007

(51) Int. Cl.
*G06T 17/00* (2006.01)
*G06T 15/00* (2006.01)

(52) U.S. Cl. ...................................... 345/424
(58) Field of Classification Search ................. 345/424
See application file for complete search history.

(56) References Cited

U.S. PATENT DOCUMENTS

| 5,187,660 | A | | 2/1993 | Civanlar et al. | |
|---|---|---|---|---|---|
| 5,201,035 | A | * | 4/1993 | Stytz et al. | 345/502 |
| 6,105,119 | A | * | 8/2000 | Kerr et al. | 711/219 |
| 6,111,582 | A | * | 8/2000 | Jenkins | 345/421 |
| 6,144,387 | A | | 11/2000 | Liu et al. | |
| 6,466,227 | B1 | * | 10/2002 | Pfister et al. | 345/619 |
| 6,525,729 | B1 | * | 2/2003 | Akerman et al. | 345/426 |
| 6,556,200 | B1 | * | 4/2003 | Pfister et al. | 345/426 |
| 6,559,843 | B1 | | 5/2003 | Hsu | |
| 6,573,893 | B1 | | 6/2003 | Naqvi et al. | |
| 6,621,918 | B1 | | 9/2003 | Hu et al. | |
| 7,042,448 | B2 | * | 5/2006 | Kunimatsu et al. | 345/419 |
| 2004/0066384 | A1 | * | 4/2004 | Ohba | 345/419 |
| 2005/0237328 | A1 | * | 10/2005 | Guhring | 345/520 |
| 2005/0285851 | A1 | * | 12/2005 | Fossum et al. | 345/419 |
| 2006/0139361 | A1 | * | 6/2006 | Busch et al. | 345/581 |
| 2006/0149938 | A1 | * | 7/2006 | Jiang et al. | 712/225 |
| 2006/0274065 | A1 | * | 12/2006 | Buyanovskiy | 345/424 |
| 2006/0290696 | A1 | * | 12/2006 | Munshi et al. | 345/428 |
| 2007/0040833 | A1 | * | 2/2007 | Buyanovski | 345/426 |

FOREIGN PATENT DOCUMENTS

| EP | 1014307 | 6/2000 |
|---|---|---|
| WO | 0077743 | 12/2000 |

OTHER PUBLICATIONS

Hillesland, Karl E.; Molinov, Sergey; Grzeszczuk, Radek; "Non-linear Optimization Framework for Image-Based Modeling on Programmable Graphics Hardware;" 2003; ACM; pp. 925-934.*

(Continued)

*Primary Examiner*—Mark Zimmerman
*Assistant Examiner*—Crystal Murdoch
(74) *Attorney, Agent, or Firm*—Renner, Otto, Boisselle & Sklar, LLP

(57) ABSTRACT

A computer automated process is presented for accelerating the rendering of sparse volume data on Graphics Processing Units (GPUs). GPUs are typically SIMD processors, and thus well suited to processing continuous data and not sparse data. The invention allows GPUs to process sparse data efficiently through the use of scatter-gather textures. The invention can be used to accelerate the rendering of sparse volume data in medical imaging or other fields.

24 Claims, 5 Drawing Sheets

Arranging ray segments in ray tiles according to an estimate of required samples.

OTHER PUBLICATIONS

Bajaj, C. et al; "Parallel Ray Casting of Visible Human on Distributed Memory Architectures;" 1999; Data Visualization, pp. 1-8.*

Ma K-L et ali: "A data distributed, parallel algorithm for ray-traced volume rendering", Parallel Rendering Symposium, 1993 San Jose, CA, USA Oct. 25-26, 1993, New York, NY, USA, IEEE, Oct. 25, 1993, pp. 15-22, 105, XP010222611.

Raju J. Karia: Load balancing of Parallel Volume Rendering with Scattered Decomposition, Proceedings of IEEE Scable High Performance Computing Conference, May 23-25, 1994 Knoxville, TN, USA, 1994, pp. 252-258, XP002405898.

Kwan-Liu Ma et al: "A scalable parallel cell-projection volume rendering algorithm for three-dimensional unstructured data" Parallel Rendering, 1997. PRS 97. Proceedings. IEEE Symposium on Phoenix, AZ, USA Oct. 20-21, 1997, Los Alamitos, CA, USA, IEEE Comput. Soc, US, Oct. 20, 1997 pp. 95-104, 119, XP010251401.

Hsu W M: "Segmented ray casting for data parallel volume rendering" Proceedings. 1993 Parallel Rendering Symposium (IEEE Cat. No. 93TH0592-6) IEEE New York, NY, USA, 1993, pp. 7-14, XP002405899.

State A et al: "Interactive Volume Visualization on a Heteroneneous Message-Passing Multicomputer" Proceedings of the Symposium on Interactive 3D Graphics. Monterey, Apr. 9-12, 1995, New York, ACM, US, Apr. 9, 1995, pp. 69-74, XP000546192.

Palmer M E et al: "Ray Casting on Shared-Memory Architectures. Memory-Hierarchy Considerations in Volume Rendering", IEEE Concurrency, IEEE Service Center, Piscataway, NY, US, vol. 6, No. 1, Jan. 1998, pp. 20-35, XP000737883.

Wittenbrink C M et al: "A scalable MIMD volume rendering algorithm", Proceedings Eighth Internatinal Parallel Processing Symposium (Cat. No. 94TH0652-8) IEEE Comput. Soc. Press Los Alamitos, CA, USA, 1994, pp. 916-920, XP002405900.

Subramanian K R et al: "Applying space subdivision techniques to volume rendering", Proceedings of the Conference on Visualization. San Francisco, Oct. 23, vol. Conf. 1, Oct. 23, 1990, pp. 150-159,470, XP010021073.

Ney, Derek R. et al. "Volumetric Rendering of Computed Tomography Data: Principles and Techniques." *IEEE Computer Graphics & Applications*. (Mar. 1990): 24-32.

Drebin, Robert A. et al. "Volume Rendering." *Computer Graphics*. 22.4 (Aug. 1998):65-74.

\* cited by examiner

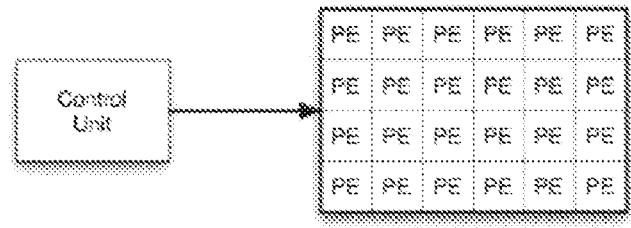
Figure 1: Example GPU architecture where an array 6x4 PEs share a control unit
(prior art)
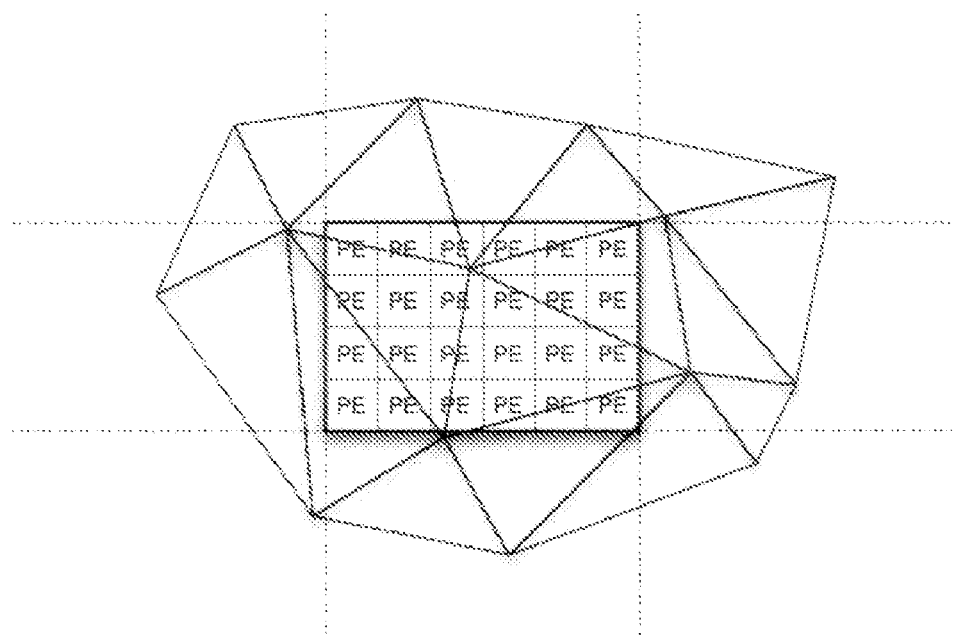
Figure 2: Part of a polygon mesh being rendered by a 6x4 array of PEs
(prior art)

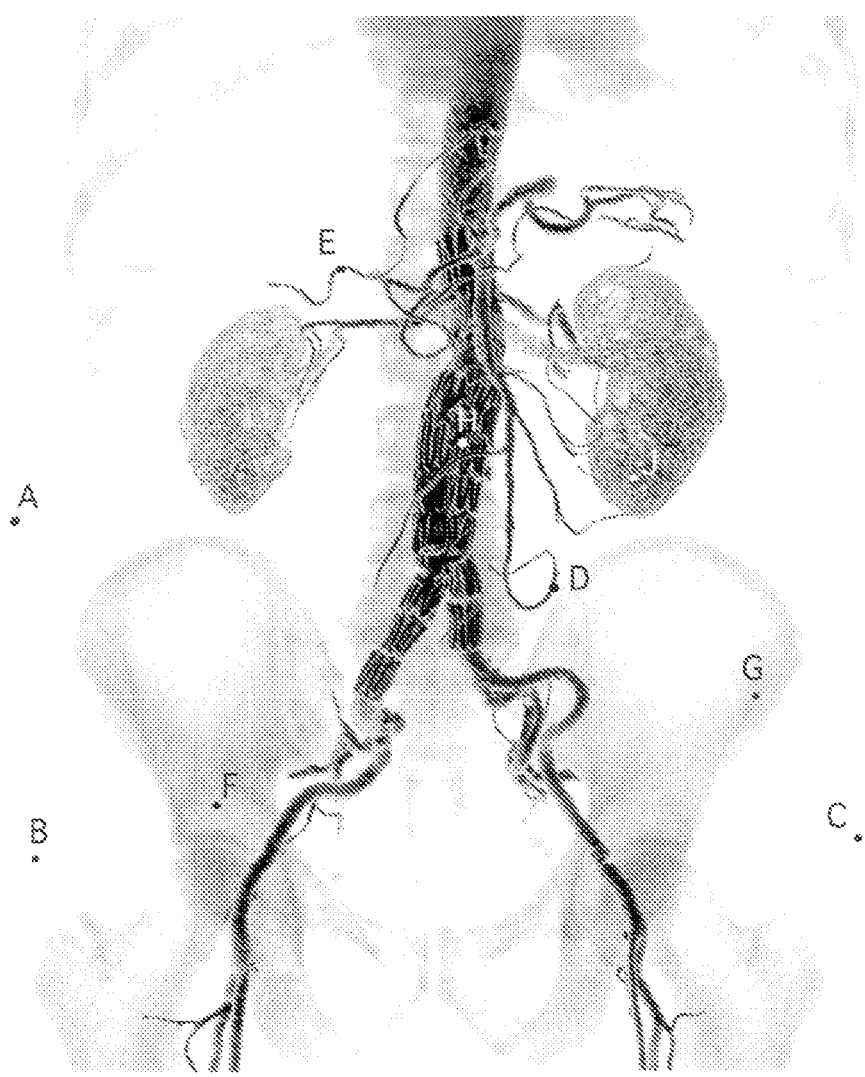
Figure 3: A medical volume rendered image showing example rays requiring different depths of processing.
(prior art)

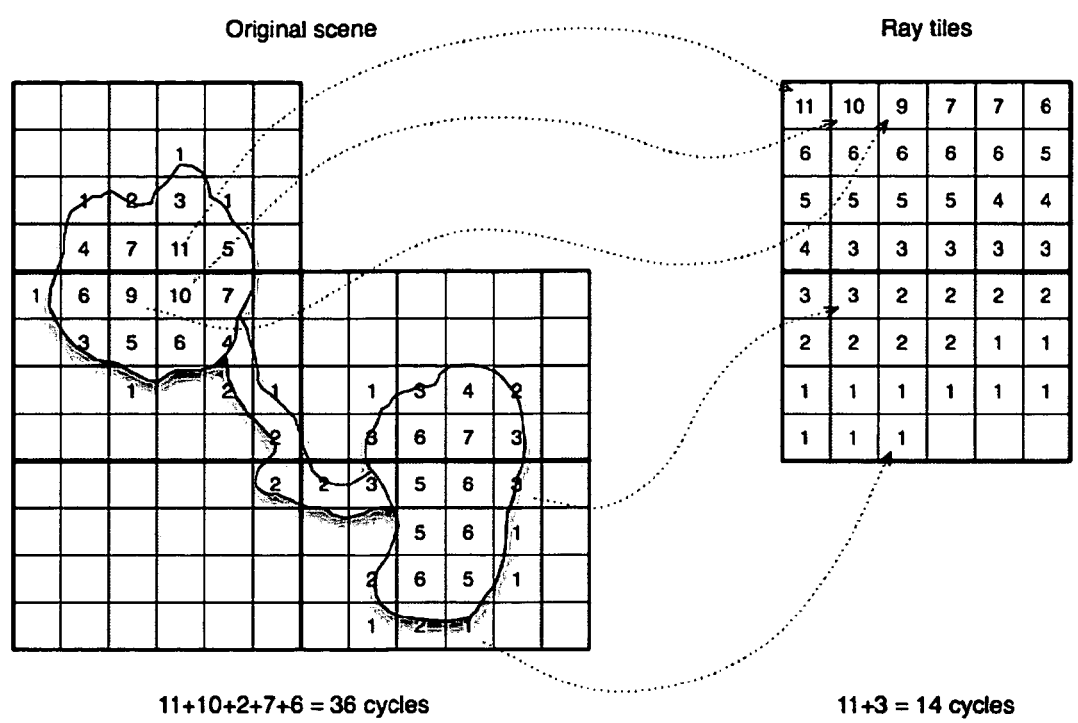
Figure 4: Arranging ray segments in ray tiles according to an estimate of required samples.

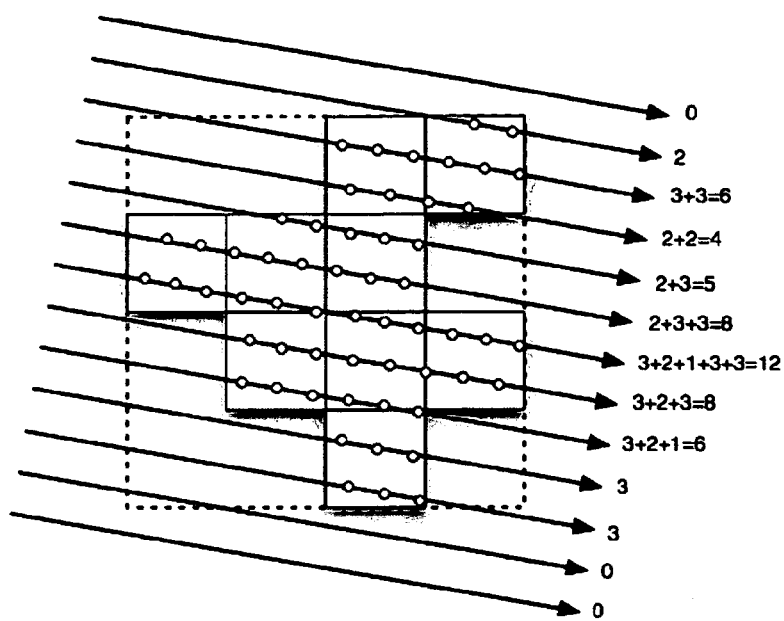
Figure 5: Estimating the number of samples in a ray block using sub-volumes
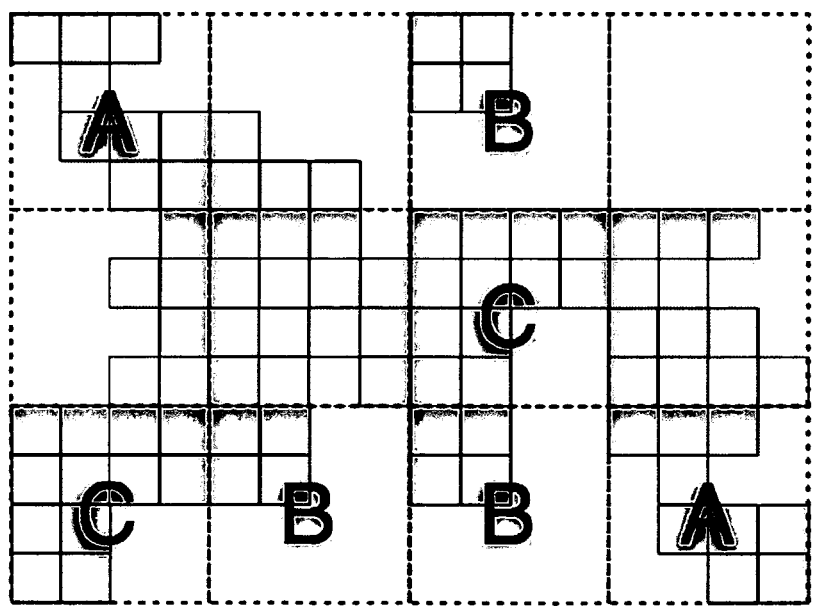
Figure 6: A representation of a volume scene where multiple ray blocks contain the same configuration of sub-volumes.

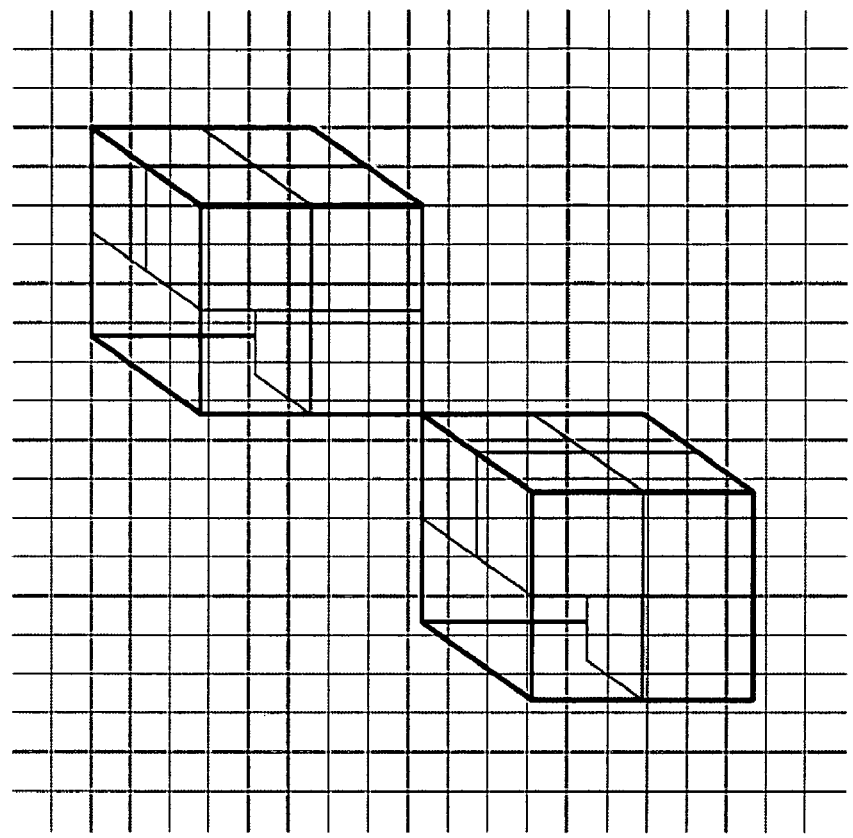
Figure 7: Two ray blocks with an equivalent internal distribution of sub-volumes, but a different fractional displacement in screen space.

VOLUME RENDERING APPARATUS AND PROCESS

BACKGROUND OF THE INVENTION

The invention relates to volume rendering, in particular how to provide acceleration of the volume rendering when using a computer system that includes a graphics processing unit (GPU).

Volume rendering is a standard method of displaying 2D projections of the 3D data sets collected by medical imaging equipment, such as computer-assisted tomography (CT) scanners, magnetic resonance (MR) scanners, ultrasound scanners and positron-emission-tomography (PET) systems. In the early days of medical imaging, volume rendering was performed on vendor-specific software and hardware associated with the scanner. However, for a number of years, application software to implement volume rendering on standard personal computers (PCs) and workstations is well known which does not utilize any bespoke hardware.

It is also the case that modern personal computers and workstations include a graphics card, and in most cases the graphics card includes a Graphics Processing Unit (GPU). Typically a GPU consists of the following units:

- A geometry processor, commonly called a Vertex Shader (VS). Its function is to perform coordinate transformations on polygons and other primitives.
- A rasterization unit, whose purpose is to convert polygons that emerge from the VS into pixel clusters for shading.
- A pixel processor commonly called a Pixel Shader (PS). Its function is to compute the shading, texture, and other visual properties of pixels.
- Other circuits such as a frame buffer, Z-buffer, hierarchical Z-buffer, stencil buffer, RAMDAC, etc. These are not of relevance to the invention.
- A memory hierarchy, typically comprising: registers in the pixel shader; on-chip cache; off-chip on-board DRAM; and access to the memory of the host system via a bus.

In terms of aggregate processing power, modern GPUs outperform CPUs by roughly an order of magnitude. They achieve this by parallel processing using a Single Instruction Multiple Data (SIMD) architecture. The SIMD architecture allows a large number of processing elements to operate on the GPU chip simultaneously, but introduces dependencies between the processing elements.

There are commonly two types of SIMD dependencies that exist in the PS unit of the GPU:

- A number of pixel processing elements (PEs) share a single control unit. Although logically each PE can execute a separate control path through the program, including conditionals and loops, the shared control unit has to decode and emit the aggregate (set union) of all the instructions required for all control paths taken by all the dependent PEs. For example, if one PE iterates a loop 15 times and then takes branch A of a conditional, while another PE iterates 10 times and then takes branch B, the control unit has to emit instructions for 15 loop iterations, branch A, and branch B. The first PE will be idle during the processing of Branch B. The second PE will be idle during the last 5 loop iterations and during branch A.
- A number of PEs are arranged so that they can process pixels that are geometrically adjacent to each other as a two-dimensional (2D) tile of the destination image buffer. For example, 24 PEs may be arranged to process a 6×4 tile of the destination image buffer. If a polygon obliquely intersects the 6×4 pixel tile, so that it covers only three pixels, the cluster of 24 PEs will have to execute the shader for that pixel. If there are no adjacent polygons covering the other 21 pixels, 21 of the PEs will stay idle for the duration of the pixel shader program.

FIG. 1 shows this schematically for the case of a GPU in which a 6×4 array or "tile" of PEs share one control unit. Some GPUs only have one control unit and PE tile, whereas other GPUs have multiple control units and PE tiles.

When a graphics card with a GPU is being used for its intended uses, the limitations imposed by the SIMD dependencies are acceptable. This is because the intended applications, such as to render large polygons, or large meshes of small polygons, cover a large area of the destination image buffer. Given adequate performance of the rasterization unit, reasonable locality of the polygons in the mesh, and an adequately large buffer for assigning rasterized polygon fragments to PEs, all PEs can be well utilized.

FIG. 2 illustrates how part of a large polygon mesh might map to an arrangement of 6×4 PEs. Each dot represents a pixel centre of the destination image buffer, rendered by one PE. Clearly, large polygon meshes can achieve good PE utilisation.

A further reason why the SIMD limitations are acceptable for typical polygon rendering applications is that the pixel shader actions are the same or very similar for all pixels covered by a polygon mesh. Thus, in the example above, it is expected that all 24 PEs will be executing the same instructions for a large fraction of their shader programs, and that the proportion of PE idle time will be low.

The present invention is based on the premise that it would be desirable to harness the processing power available in a GPU to accelerate the volume rendering process. This is not a new idea.

Although not originally designed with this use in mind, GPUs have sufficiently general programmability that they can be applied to the task of volume rendering, in particular, to volume rendering in medicine, where the task is usually to render images of the internal organs of human patients. However, when applied to volume rendering in medicine, the SIMD limitations of GPUs discussed above will tend to have a strong detrimental effect on performance for the following reasons:

- Although CT, MR, and PET scanners scan a large section of the body, the typical display requirement is to show only certain organs, such as blood vessels, kidneys, the skeleton, etc. These organs occupy a small fraction of the space inside the patient. Thus, volume rendering for medical applications is best suited to selective, sparse processing of the volume. However, the SIMD architecture of GPUs is best suited to uniform processing of the whole volume.
- Volume rendering algorithms require the processing of a large number of samples per pixel, roughly proportional to the depth of the ray that is cast through the pixel to sample the volume. Given the sparse nature of the volume, some pixels will require many depth samples to be processed, while others will require few or none. The SIMD limitations means that the overall processing time of a tile of pixels, such as the 6×4 tile described in the example, is the time needed to process the longest ray in the tile.

FIG. 3 shows an image of a typical volume-rendered image of a patient's kidney and associated vessels. In this figure, the rendering parameters have been set to display only the kidneys, vessels, and skeleton, making all the other material transparent. Clearly, certain pixels (A, B, C) display only transparent space, while others (D to J) display tissue.

Of the pixels that display tissue, the depth of tissue that must be sampled for each pixel varies considerably. Rays cast through pixels D and E hit a relatively thin section of tissue. Rays cast through F and G hit a thick section of tissue, which must all be processed because the rendering parameters define it as partially transparent. Rays H and J hit a thick section of vessel or kidney but, because vessel and kidney are displayed as opaque, only the surface samples need to be processed.

Thus the ranking of rays by decreasing depth of tissue that needs to be processed is roughly as follows: F, G, D, E, H, J, A, B, C. This image has been created for illustration and the example pixels are much further apart than the 6×4 or similar tile that the GPU is constrained to render in SIMD mode. However, a similar variability of the depth of rays that need to be processed occurs at the 6×4 or similar tile scale, and thus the SIMD limitations of the GPU degrade the performance of the volume rendering application. An example of highly local variability of the ray depth would be a projection of a blood vessel.

The object of the present invention is to circumvent the SIMD limitations of GPUs and achieve more efficient rendering of sparse volume data.

SUMMARY OF THE INVENTION

The invention provides a volume rendering process based on casting rays in a volume data set, wherein the process is designed to run on a computer system including a processing unit with a SIMD architecture, the process comprising:

arranging the rays into different ray tiles according to a prediction of the amount of processing needed to render each ray or ray segment;

performing rendering on each of the ray tiles in the processing unit to create an intermediate rendered image; and transforming the intermediate rendered image by permuting the intermediate image to a correct rendered image.

The invention thus uses scatter-gather programming techniques to provide a process that permutes the ray segments cast through the volume so that ray segments can be processed in a manner consistent with the limitations of the GPU and then permute the resulting pixels or partial pixels in an inverse manner to form the final image. This process circumvents the SIMD dependencies that exist in the PS unit of the GPU.

It will be understood that the rays may be complete rays or segments of rays depending on whether the ray passes through the whole of the volume being considered or only a part thereof, or only needs to be considered over a part of its length, for example due to opaque voxels.

Variations of the process are possible as described below, and the process is also applicable to sparse volume data sets outside the medical imaging field.

In this process it is advantageous if, prior to arranging the rays into the ray tiles, the rays are partitioned into ray blocks that are local in the volume, and wherein the arranging of the rays into the ray tiles is performed only among rays in the same ray block.

By first partitioning the rays into ray blocks before the ray tiling, it is ensured that all rays in any one ray tile come from the same region of the volume. This is useful, since it ensures that all the volume data for any one ray tile will come from a relatively narrow memory address range. In turn, this ensures that memory caching will function efficiently. Although beneficial to performance in hierarchical memory architectures, it is noted that the ray blocking is not essential. In principle, rays from all over the volume data set could be arranged in a single ray tile.

The partitioning can be done along any convenient dividing pattern, such as 2D tiles of image space, 3D blocks of image space, or 3D blocks of volume space. Such 2D tiles or 3D blocks can be regular or of varying size. Where the partitioning is by 3D blocks, we speak of "ray segments" rather than rays within each block.

Prediction of the amount of processing required to render each ray or ray segment can be performed in a variety of ways.

For example, the prediction of the amount of processing required to render each ray or ray segment can be based on an estimation of the number of depth samples needed to process each ray or ray segment. The number of depth samples can be estimated based on an analysis of sub-volumes that enclose the subset of the voxels that will have a significant effect on the rendering. Such sub-volumes are typically convenient geometric approximations (e.g. blocks, beams, spheres, etc.) of the very complex geometry of voxels that need to be rendered. If such sub-volumes are used, ray segments may be partly enclosed in them, so that only parts of the ray segment need to be processed. Alternatively, the number of depth samples can be estimated based on a direct analysis of the voxel values of the volume data set. This direct approach will provide accurate estimation, but at the cost of increased processing power, so may undesirably load the CPU in some situations.

Another example is that the prediction of the amount of processing required to render each ray is based on performing a simplified rendering process on the volume data set. For obvious reasons, the full rendering process cannot be used for the estimation, since this would be counterproductive. However, a simplified rendering process can be used, in which the simplifications reduce the processing power needed to some fraction of the full rendering process. For example, the simplified rendering may be performed at lower resolution, or with a limited subset of parameters such as without textures or colors or other simplifications.

The processing unit preferably includes a pixel shader, as would be provided in a standard GPU, the pixel shader having at least one control unit, and each control unit being associated with a plurality of pixel processing elements (PEs). The ray tiles preferably have a number of elements matched to the number of PEs per control unit. The number of elements per ray tile may be an integer multiple of the number of PEs per control unit, or the number of PEs per control unit is an integer multiple of the number of elements per ray tile. Most preferably they are the same, i.e. the integer is one.

The rays may be arranged into ray tiles using a gather map, which associates the initial parameters of each ray with a cell of the ray tile. The gather map may be implemented as a texture.

A scatter map may also be advantageously used. For example, the permutating of the intermediate image to the correct rendered image can use a scatter map, which associates rendered pixels of the intermediate image with their correct position in the rendered image. The scatter map can be implemented as a texture.

Reduction in computations needed may be achieved by appropriate reuse of prior tile arrangements. Specifically, during arrangement of the rays into ray tiles prior arrangements can be reused when the prediction of the amount of processing needed to render each ray or ray segment exhibits a recurring pattern. The reusing can be implemented by reusing scatter maps and/or gather maps.

Another option for reuse is when, during arrangement of the rays into ray tiles, prior arrangements are reused when the prediction of the amount of processing needed to render each ray or ray segment is substantially the same for two or more ray blocks, for example the same or within a defined similarity range (e.g. ±1%, 5%, 10%). In this case the prediction of the amount of processing needed to render each ray or ray segment can be based on the configuration of sub-volumes that enclose the subset of the voxels that will have a significant effect on the rendering relative to the ray block concerned. The reusing can be implemented by reusing scatter maps and/or gather maps in this case also.

A further option for reuse is when, during arrangement of the rays into ray tiles, prior arrangements are reused when the prediction of the amount of processing needed to render each ray or ray segment is such that for a subset of ray blocks {1 ... N} the prediction for ray blocks 2 ... N is a subset of the prediction for ray block 1, in which case the prior arrangement for ray block 1 is reused. In this case the prediction of the amount of processing needed to render each ray or ray segment can be based on the configuration of sub-volumes that enclose the subset of the voxels that will have a significant effect on the rendering relative to the ray block concerned. The reusing can be implemented by reusing scatter maps and/or gather maps in this case also.

The step of transforming the intermediate rendered image by permuting the intermediate image to a correct rendered image may include the sub-steps of: (a) permuting the intermediate image resulting from the rendering of the ray tiles pertaining to each ray block into a second intermediate image that is a correct rendered image of the ray block in isolation; and (b) compositing the second intermediate image into the correct rendered image. Optionally this embodiment may further comprise shifting the second intermediate image by applying an XY translation in image space, wherein the shifting is performed after the permuting sub-step and before the compositing sub-step.

Further aspects of the invention provide a computer program product bearing computer readable instructions for performing the process of the invention, and a computer system including a processing unit with a SIMD architecture, the computer system being loaded with computer readable instructions for performing the process of the invention.

BRIEF DESCRIPTION OF THE DRAWINGS

For a better understanding of the invention and to show how the same may be carried into effect reference is now made by way of example to the accompanying drawings in which:

FIG. 1 illustrates an example of a hypothetical GPU architecture where a 6×4 tile of PEs share one control unit;

FIG. 2 illustrates part of a conventional polygon mesh being rendered by 6×4 PEs;

FIG. 3 shows an image of a typical volume-rendered image of a patient's kidney and associated vessels;

FIG. 4 is a highly schematic representation showing a simplified example of how rays are arranged into different ray tiles according to a the number of depth samples for each ray;

FIG. 5 shows a 2D schematic representation of a 16×16×16 voxel ray block which contains an example configuration of 4×4×4 voxel sub-volumes, such sub-volumes being the minimal set that includes material to be processed. Rays are shown traversing the block in an example arbitrary orientation. The estimation of ray sample depth based solely on geometric relationship with sub-volumes is illustrated.

FIG. 6 shows a 2D schematic representation of an example 3D volume rendering scene where only a sparse subset of the material contributes to the output image, and where such material is enclosed in sub-volumes (solid blocks). The scene is additionally divided into ray blocks (dotted blocks). Some configurations of sub-volumes within ray blocks occur more than once in the scene (patterns A, B, and C) and it is advantageous to re-use scatter and gather maps for these recurrent configurations.

FIG. 7 shows simplified example a 3D volume rendering scene consisting of two non-trivial ray blocks, each containing the same sub-volume configuration. A very coarse (for the purpose of illustration) pixel grid is superimposed. It can be seen that, due to sub-pixel displacement, the two ray blocks would nominally require separate gather and scatter maps. An intermediate image and a shifting step during composition allows gather maps to be reused.

DETAILED DESCRIPTION

In an embodiment of the invention, the SIMD limitations of GPUs described further above are circumvented when processing a medical image data set or other kinds of sparse volume data sets by the following technique:

1. Select a viewpoint, transfer function, and other rendering parameters. These parameters define a set of notional rays that should be cast from the viewpoint, through pixels of the destination image buffer, into the volume.

2. Partition the rays into smaller sets of rays or ray segments that have locality in two or three dimensions. For example, such partition may be by 2D tiles of the destination image buffer or by 3D blocks of the space in which rays are cast. Such sets of rays or ray segments will be called "ray blocks"

3. For each ray block, estimate the number of depth samples that would be needed to process each ray (or ray segment) within the block. Exclude from the estimate those depth samples that fall outside the volume, in transparent material, or in material that is known to be occluded by other opaque material. Include only samples that fall on non-transparent, non-occluded voxels.

4. Discard any rays that require zero samples. Arrange the remaining rays (or segments) of each ray block into smaller sets called "ray tiles". The arrangement is such that the number of rays per tile matches the constraints imposed by the SIMD architecture of the GPU (in this example 24 rays per tile) and so that the variation in number of depth samples needed to process each ray in the tile is minimised. The rays that get placed in each ray tile do not have to be spatially adjacent. Such partition may be accomplished by means such as:

a. Ranking the rays (or ray segments) in each ray block by number of depth samples required, and filling ray tiles sequentially from the ordered list; or b. Executing an optimization algorithm that attempts to minimise the sum over all ray tiles of the maximum difference in samples required among the rays in the tile; or c. A hybrid approach that attempts to assign rays of similar number of required depth samples per tile, but also attempts to preserve spatial proximity between rays in the tile if possible.

5. For each ray tile, create a mapping, called a "gather map". The gather map maps the rays (or ray segments) that make up the tile from their position in the ray block to their (arbitrary) position in the ray tile. The gather map includes all parameters required to initiate each ray (or ray segment), such as starting volume coordinates or any other required parameters. A gather map may be implemented as a texture called a "gather texture", at least equal in size to a ray tile, where each pixel holds the above parameters for one ray segment.

For convenience, the gather textures of all the ray tiles in the ray block can be stitched together to form one gather texture for the whole block.

6. For each ray block, render the ray tiles such that each ray tile falls into one tile of PEs as per the SIMD constraints of the GPU (in this example, a 6×4 tile of PEs would process exactly one ray tile at a time). The destination of the rendering is an intermediate image, which represents a permutation of the pixels of a conventional rendering of the ray block. Rendering should generate color and opacity information per pixel. The rendering can be implemented by reading the ray or ray segment parameters from a single texel of the gather texture as the first step of a pixel shader program.

7. For each ray block, create a mapping, called a "scatter map". The scatter map maps the pixels of the intermediate image in the inverse pattern of the gather map, to achieve a correct rendered image of the ray block. The scatter map can be implemented as a texture at least equal in size to the projection of the ray block, where each texel holds the XY coordinates where the pixel should be fetched from the permuted image of the block.

8. Apply the scatter map to permute the pixels of the intermediate image and form a correct rendered image of the ray block in isolation. This mapping can be implemented as single-sample texturing.

9. Perform appropriate color/opacity compositing of the rendered image of each ray block into the whole scene.

This technique largely avoids the SIMD limitations of GPUs because during the time consuming 3D rendering operation (step 6) all rays in a ray tile require a similar number of depth samples and rays requiring zero samples are eliminated. The technique achieves this at the cost of requiring additional gather and scatter stages, where redundant pixels are indeed processed. However, the gather and scatter steps are simple 2D operations, and are very fast compared to the 3D rendering operation.

EXAMPLE

FIG. 4 is a highly schematic representation showing a simplified example of how rays are arranged into different ray tiles according to a the number of depth samples for each ray. The volume data set is shown shaded grey in highly simplified fashion as two generally round features separated by an elongated tube. This is intended to represent a sparse image data set as is typical of medical image data. A square grid is superimposed on the image data, with numbers shown being the number of depth samples for each ray passing through the image data. The number of depth samples may be calculated simply according to pure geometry, perhaps using some lower threshold of opacity. The grid is in 6×4 tiles of the destination image buffer, for example.

A naive implementation would involve sending each of the five tiles for processing in the GPU, assuming that tiles with no data relevant to the final image would be screened out. This would result in processing in the pixel shader for the five tiles. Assuming that one cycle is taken per depth sample, the total number of processing cycles would be the sum of the maximum number of depth samples in each tile, in this case 11+10+2+7+6=36 as shown in the figure.

On the other hand following the teaching of the invention, the significant rays are arranged into different ray tiles according to the number of depth samples for each ray. The mapping of five example rays is shown with arrows. The ray tiles are filled in order of magnitude of ray sampling depth.

In this way, each tile is populated with rays having the least variance in depth, thereby minimising the overall idle time in the pixel shader as each tile is processed. Even with the present highly simplified example, the performance improvement can be seen. The pixel shader processes one tile with depths between 11 and 3, and a second tile with depths of 3 to 1. The total number of cycles is thereby 11+3=14, i.e. less than half the number of cycles as the naive implementation.

Spatial Locality and Ray Blocks

It would be possible to apply the scatter-gather technique to all the rays in a volume-rendering scene without partitioning into blocks. However, there are two reasons why partitioning the scene into ray blocks would improve the practical performance of the algorithm: Memory locality and complexity of scatter-gather maps.

Although each PE of a GPU can generate requests to fetch data from arbitrary locations in texture memory (in other words anywhere in the volume), the memory hierarchy of the GPU does favour locality of reference, as is common with computer memory hierarchies. This is due to the presence of cache memory as well as possible locality effects of the memory chips and bus architectures used in the implementation. Thus, it is advisable that adjacent PEs render spatially proximal ray segments, rather than widely separated ray segments, concurrently.

A simple assignment of ray segments to ray tiles based on ranking by number of samples to be processed would be effective over the whole scene. However, other algorithms for optimising the assignment of ray segments to tiles may only be practical when applied to a smaller subset of the scene at a time.

For these reasons it is desirable to partition the rays to be cast into ray blocks. The partitioning can be done along any convenient dividing pattern, such as 2D tiles of image space, 3D blocks of image space, or 3D blocks of volume space. Such tiles can be regular or of varying size. Where the partitioning is by 3D blocks, we speak of "ray segments" rather than rays within each block.

The optimal choice of partitioning the scene into ray blocks depends on the performance characteristics of the memory hierarchy of the GPU, and not substantially on the SIMD limitations of its processing. A satisfactory choice can be reached by design or experimentation. Such experimentation can be automated, by providing a benchmarking program that measures performance of the memory hierarchy under different topologies and parameters of partitioning.

Without prejudice to generality, the remaining of this discussion will assume that ray segments are processed one ray block at a time.

Estimating the Number of Samples Per Ray

Several factors determine the number of 3D samples that need to be processed to render a ray segment. These can be classified as follows:

1. Geometric relationship with the volume: Some ray segments will be fully included in the volume, while others will intersect some faces of the volume so that only part of the ray segment is in the volume.

2. Geometric relationship with a bounding sub-volume: It is a common optimisation technique of volume rendering (independent of this invention) to define sub-volumes that enclose only the subset of the voxels that potentially participate in the rendering. Such sub-volumes are convenient geometric approximations (blocks, beams, spheres, etc.) of the very complex geometry of voxels that need to be rendered. If such sub-volumes are used, ray segments may be partly enclosed in them, so that only parts of the ray segment need to be processed.
3. Transparent voxels: Transfer functions typically used for volume rendering, including in medicine, map a large proportion of the voxels to transparent so that they do not obscure other voxels that are of interest. Samples along the ray segment that fall on transparent voxels don't need to be processed.
4. Occluded voxels: In typical volume rendered scenes, including in medicine, many rays will reach close to 100% opacity. In fact, a large proportion of they rays that are not entirely transparent will reach 100% opacity in a given scene. Voxels that lie further from the viewpoint than the point where the ray reaches 100% opacity (or some threshold judged to be close enough to opaque) don't need to be processed. Some or all the samples in a ray segments may be rejected for this reason.
5. Sampling density: It is not compulsory to distribute samples in an equally dense grid throughout the volume. Some regions of the volume will be mapped to higher opacity, or will be more variable than others, and such regions require more samples than relatively transparent or unvarying regions. Both the spatial density of ray segments (in the XY axes of image space) and the density of samples along the ray segment (in the Z axis of image space) may be varied to apply sampling more optimally. In the latter case, the sample density will affect the number of samples that need to be processed in a ray segment.

An optimal implementation of the invention would take all of these factors into account, and thus calculate precisely the number of samples that need to be processed for each ray segment. However, practical factors may dictate that only a subset of these factors, and thus only an approximate estimate, is feasible in a realistic implementation.

Factors 1 and 2 (geometric relationships) are eminently practical and recommended. Factor 3 (transparent voxels) may be practical, for some rendering algorithms. The precise relationship between the ray segment and transparent voxels is complex, and may be more practical to compute with algorithms that employ some restricted ray geometry, such as shear-warp, rather than with generic ray casting. Factor 4 (occlusion) is least likely to be practical because an accurate determination of occlusion is both view-dependent and data-dependent, and would typically require a feedback loop between rendering and occlusion determination. This is cumbersome given the organization of typical computer systems. Factor 5 (sampling density) is relatively practical in approximation.

Without prejudice to generality, the remainder of this discussion will assume that uniform, cubic, grid-aligned sub-volumes are provided around non-transparent voxels, and only factors 1 and 2 are used to estimate the number of samples per ray segment. Again without prejudice to generality, a generic ray-casting algorithm is assumed.

EXAMPLE

FIG. 5 shows an example of how samples per ray may be estimated for a ray block. For the purpose of illustration, we assume that ray blocks are formed along 16×16×16 voxels of volume space, while the sub-volumes that delineate non-transparent voxels are 4×4×4 cubes aligned to multiples of 4 in the same coordinate grid.

The calculation for each ray segment indicates the number of samples that need to be processed to render the ray segment. In this example that is determined solely from the extent of the ray that falls within sub-volumes, but any other factors could be used in general.

Forming the Gather and Scatter Maps

The gather map is simply a 2D array whose dimension is a multiple of the natural tile size of the GPU (6×4 in this example) and where each cell contains the parameters necessary to cast a ray though the ray block. The gather map is formed by permuting the ray starting parameters as indicated in the previous section.

In a practical implementation, the gather map may be a 2D texture of four channels of type 32-bit float (nominally these are labelled RGBA, suggesting that they hold color information, but any vector of four floating-point numbers can be stored). In the most straightforward implementation, the RGB channels could hold the XYZ starting position of the ray in volume space, with A being spare. In a more advanced implementation, two channels could store the XY coordinate of the original ray in image space, since the permutation leaves Z invariant, and the other two channels could hold start and end Z coordinates for ray casting. Other encodings using only two-channel or one-channel textures are possible. Textures with less than 32-bit float precision could be used for an approximate implementation.

Although the GPU is generally able to write into textures and use them later, the task of ordering and permuting data in the way necessary to form the gather map is not well suited to GPU processing. Although it may be possible to implement it with GPU programming, we assume herein that it is done using the CPU. The number of gather maps that need to be constructed per scene may be a bottleneck. Therefore, it would be desirable to generate a small number of gather and scatter maps and use them repeatedly.

In the case where the gather and scatter maps are generated purely using an approximate estimation of the number of samples per ray, that is feasible, because the same approximate determination may be valid to more than one region of the volume. As an example, consider the case where the geometric relationship between ray segments and sub-volumes is the only factor used to estimate the number of samples per ray. In that case, a recurring configuration of sub-volumes in different parts of the scene can be served by the same gather and scatter maps.

Consider the previous example where sub-volumes are blocks of size $(2^a, 2^b, 2^c)$ where a, b, c, are integers, and they are aligned to the volume grid at coordinates that are multiples of $2^a$, $2^b$, $2^c$ in each respective axis. If we declare that each sub-volume is a ray block, then the gather and scatter map depends only on the dimensions of the sub-volume/ray block and not its position. Thus, a gather and scatter map can be generated and used for all ray blocks of size 16×16×16, another for all ray blocks of size 8×8×16, and so on, for all the different sizes of ray blocks that exist in the scene.

A more elaborate strategy would be to maintain 1-to-N relationship between ray blocks and sub-volumes, and to create a unique gather map for every unique configuration of sub-volumes within a block that occurs in the scene. For example a 16×16×16 ray block may contain a 8×8×8 and a 4×4×4 sub-volume in one part of the scene. If the same configuration occurs elsewhere in the scene, the gather map for that ray block could be re-used. A refinement would be to re-use a more inclusive gather map (such as one relating to an 8×8×8 and 4×4×4 sub-volume) in a situation where a less inclusive gather map is sufficient (such as an 8×8×8 sub-volume only) and thus trade off higher complexity of the rendering for smaller complexity in creating gather and scatter maps.

EXAMPLE

FIG. 6 shows a diagrammatic 2D representation of a 3D volume rendering scene partitioned into 16×16×16 voxel ray blocks, containing 4×4×4 voxel sub volumes. It can be seen that certain configurations of sub-volumes within ray blocks (labelled A, B, C) occur more than once through the scene. Thus, it is advantageous to construct scatter and gather maps only for unique configurations of sub-volumes within ray blocks, and reuse them when possible.

As for the determination of scatter maps, these need to contain the inverse mapping from the gather maps, so that the pixels rendered by the pixel PEs can be re-ordered into their correct positions to form a rendered image of each ray block. As such, scatter maps are entirely dependent on gather maps and would be most readily computed at the same time.

In a practical implementation, a scatter map can be a 2D texture whose size is just large enough (subject to constraints on texture sizing that exist on some GPUs) to contain the footprint of a ray block in image space, such that the ray block is transformed to lie flush with the origin of image space. Each element of the texture needs to store the integer XY coordinates in the rendered ray tiles where that pixel should be fetched. A simple scheme based on a two-channel integer texture may suffice. A suitable approach, such as a reserved XY value, can be used to indicate background pixels (those that correspond to rays of zero depth).

Rendering the Ray Blocks

Given the previous description, the rendering steps used to render each ray block should be readily appreciated and are as follows:

1. Ensure that the voxel data pertaining to the ray block is loaded into memory accessible to the GPU. Depending on the rendering algorithm used, this may be a 2D or 3D texture, or section of a larger texture.
2. Select an appropriate gather map for the ray block. They gather map may be computed on demand, if this is practical, or selected from a list indexed by the characteristics of the ray block.
3. Initialize and select as the rendering target a blank image of the ray tile. The image of the ray tile will, in general be the same size as the gather map texture, except where practical considerations require it to be a different size. For example it might be a portion of a larger image, or split in several smaller images.
4. Render a polygon, usually but without prejudice to generality a quadrilateral formed by two triangles that covers the area of the ray tile. Use a pixel shader that does the following for each pixel:
    a. Fetch the ray parameters of the pixel from the corresponding cell of the gather map texture.
    b. Initialize a ray casting or equivalent projection algorithm using these parameters.
    c. Perform ray casting or an equivalent projection algorithm with the required number of ray steps. Some shader languages allow the use of loops to do this. Other shader languages do not have loops, so it is necessary to render the same or an adjusted polygon repeatedly, once for each ray step.
5. Select as the rendering target the image where the rendering of the ray block will be reconstructed. This can be a blank image created for the purpose, or a portion of the final image, or a portion of some intermediate image (see next section).
6. Select the scatter map of the ray tile as a texture. The choice of scatter map is determined by the earlier choice of gather map. Normally the scatter map will be the same size as the projection of the ray block.
7. Select the previously computed ray tile image as another texture.
8. Render a polygon, typically a quadrilateral composed of two triangles that covers the projection of the ray block in the target image. Use a pixel shader that does the following for each pixel:
    a. Fetch a pair of coordinates corresponding to each pixel from the corresponding cell of the scatter map texture.
    b. Use the pair of coordinates as an index and fetch the color and opacity values of the pixel, or other types of pixel values, from the indexed cell of the ray tile.
    c. Perform composition of the pixel with the target image in the way appropriate to the rendering algorithm, for example using color/opacity composition, maximum intensity composition, or any other composition technique.
9. Discard (make available for recycling) the ray tile image.

The result is a rendered image of the ray block, either already composited into the scene or stored in an intermediate image so that it can be composited into the scene at another time.

Compositing Images of Ray Blocks onto the Scene

In general, it would be desirable to perform composition of images of ray blocks immediately onto the scene. Thus, in terms of the previous section, Step 5 would not create a blank intermediate image but would select a portion of the final images as the target.

However, there are two reasons why it may be beneficial to perform the scatter operation into an intermediate image, and later composite that image onto the scene:

1. If using multiple GPUs in a parallel configuration, a natural way to split the work is to assign distinct ray blocks to each GPU, whereby each GPU returns as results intermediate images containing the rendered projections of each ray block. These intermediate images can later be combined, in the appropriate order, to form the scene.
2. It is desirable to re-use the same gather and scatter map every time that it is possible to do so for two ray blocks, for example every time that two ray blocks share the same or an equivalent configuration of sub-volumes. However, the relationship of ray blocks to image space is such that two otherwise equivalent (in terms of sub-volumes or similar estimated distribution of ray samples) ray blocks may start at different fractional coordinates in image space, and thus would in principle require distinct gather and scatter maps. An intermediate image and an extra shifting step would allow the same gather and scatter maps to be reused for all such ray blocks.

To clarify the second case, consider a scheme where, without loss of generality, ray blocks are blocks of volume space and ray samples are estimated using sub-volumes, as in previous examples. Two or more ray blocks within the volume share the same internal distribution of sub-volumes. However, the fractional position of the projections of the blocks in image space is not in general the same, and thus notional rays traverse the two blocks in a different pattern in relation to the sub-volumes, requiring a separate gather and scatter map for each block.

EXAMPLE

FIG. 7 shows an example of volume rendering scene (simplified for illustration) where two ray blocks have the same internal configuration of sub-volumes. However, due to the arbitrary real-valued position of ray block projections within the rendered image, there is a fractional displacement of the ray grid with respect to each block. This means that, in principle, two separate scatter and gather maps need to be constructed. It is advantageous to overcome this issue and reuse the same scatter and gather maps.

In this situation, it is possible to re-use gather and scatter maps by considering each ray block in isolation and performing the gather operation into an intermediate image. First, each ray block is individually translated to an intermediate space, for example so that it lies as close as possible to the origin on the bottom right quadrant of the space. Then the ray block is rendered according to the present invention in that intermediate image space. It will be appreciated that where two ray blocks have the same internal distribution of sub-volumes (or any other metric used to estimate ray samples) the gather and scatter maps can be reused.

In this way, the two ray blocks are rendered into intermediate images, using the same gather and scatter maps, and then the intermediate images are composited with the scene using the correct integer and fractional XY displacement, and the correct Z order to make the ray blocks appear in the correct place in the 3D scene.

One way to do this composition is to use the intermediate image of the ray block (the one that resulted after the scatter step) as a texture, and draw an appropriately displaced quadrilateral onto the destination image. In the case where the projection mode depends on the depth ordering of the samples (for example where opacity is used but not when maximum or sum projection is used) the intermediate images need to be composited in the correct Z order.

What is claimed is:

1. A volume rendering process based on casting rays in a volume data set, wherein the process is designed to run on a computer system including a graphics processing unit with a SIMD architecture, the process comprising:
   arranging the rays into different ray tiles according to a prediction of the amount of processing needed to render each ray or ray segment;
   creating a gather map, which associates the initial parameters of each ray with a cell of the ray tile;
   performing rendering on each of the ray tiles in the graphics processing unit using the volume data set and the gather map to create an intermediate rendered image;
   creating a scatter map, which associates rendered pixels of the intermediate image with their correct position in the rendered image; and
   transforming the intermediate rendered image by permuting the intermediate image to a correct rendered image in the graphics processing unit using the scatter map.

2. The process of claim 1, wherein, prior to arranging the rays into the ray tiles, the rays are partitioned into ray blocks that are local in the volume, and wherein the arranging of the rays into the ray tiles is performed only among rays in the same ray block.

3. The process of claim 1, wherein the prediction of the amount of processing required to render each ray or ray segment is based on an estimation of the number of depth samples needed to process each ray or ray segment.

4. The process of claim 3, wherein the number of depth samples is estimated based on an analysis of sub-volumes that enclose the subset of the voxels that will have a significant effect on the rendering.

5. The process of claim 3, wherein the number of depth samples is estimated based on a direct analysis of the voxel values of the volume data set.

6. The process of claim 1, wherein the prediction of the amount of processing required to render each ray is based on performing a simplified rendering process on the volume data set.

7. The process of claim 1, wherein the graphics processing unit includes a pixel shader, the pixel shader having at least one control unit, and each control unit being associated with a plurality of pixel processing elements (PEs).

8. The process of claim 7, wherein the ray tiles have a number of elements matched to the number of PEs per control unit.

9. The process of claim 8, wherein the number of elements per ray tile is an integer multiple of the number of PEs per control unit.

10. The process of claim 8, wherein the number of PEs per control unit is an integer multiple of the number of elements per ray tile.

11. The process of claim 1, wherein the gather map is implemented as a texture.

12. The process of claim 1, wherein the scatter map is implemented as a texture.

13. The process of claim 1, wherein during arrangement of the rays into ray tiles prior arrangements are reused when the prediction of the amount of processing needed to render each ray or ray segment exhibits a recurring pattern.

14. The process of claim 13, wherein the reusing is implemented by reusing at least one of scatter maps and gather maps.

15. The process of claim 2, wherein during arrangement of the rays into ray tiles prior arrangements are reused when the prediction of the amount of processing needed to render each ray or ray segment is substantially the same for two or more ray blocks.

16. The process of claim 15, wherein the prediction of the amount of processing needed to render each ray or ray segment is based on the configuration of sub-volumes that enclose the subset of the voxels that will have a significant effect on the rendering relative to the ray block concerned.

17. The process of claim 15, wherein the reusing is implemented by reusing at least one of scatter maps and gather maps.

18. The process of claim 2, wherein during arrangement of the rays into ray tiles prior arrangements are reused when the prediction of the amount of processing needed to render each ray or ray segment is such that for a subset of ray blocks {1 . . . N} the prediction for ray blocks 2 . . . N is a subset of the prediction for ray block 1, in which case the prior arrangement for ray block 1 is reused.

19. The process of claim 18, wherein the prediction of the amount of processing needed to render each ray or ray segment is based on the configuration of sub-volumes that enclose the subset of the voxels that will have a significant effect on the rendering relative to the ray block concerned.

20. The process of claim 18, wherein the reusing is implemented by reusing at least one of scatter maps and gather maps.

21. The process of claim 2, wherein the step of transforming the intermediate rendered image by permuting the intermediate image to a correct rendered image includes the sub-steps of:
   a. permuting the intermediate image resulting from the rendering of the ray tiles pertaining to each ray block into a second intermediate image that is a correct rendered image of the ray block in isolation; and b. compositing the second intermediate image into the correct rendered image.

22. The process of claim 21, further comprising shifting the second intermediate image by applying an XY translation in image space, wherein the shifting is performed after the permuting sub-step and before the compositing sub-step.

23. A computer program product bearing computer readable instructions for performing the a volume rendering process based on casting rays in a volume data set, wherein the process is designed to run on a computer system including a graphics processing unit with a SIMD architecture, the process comprising:

arranging the rays into different ray tiles according to a prediction of the amount of processing needed to render each ray or ray segment;

creating a gather map, which associates the initial parameters of each ray with a cell of the ray tile;

performing rendering on each of the ray tiles in the graphics processing unit using the volume data set and the gather map to create an intermediate rendered image;

creating a scatter map, which associates rendered pixels of the intermediate image with their correct position in the rendered image; and transforming the intermediate rendered image by permuting the intermediate image to a correct rendered image in the graphics processing unit using the scatter map.

24. A computer system including a graphics processing unit with a SIMD architecture, the computer system being loaded with computer readable instructions for performing a volume rendering process based on casting rays in a volume data set, the process comprising:

arranging the rays into different ray tiles according to a prediction of the amount of processing needed to render each ray or ray segment;

creating a gather map, which associates the initial parameters of each ray with a cell of the ray tile;

performing rendering on each of the ray tiles in the graphics processing unit using the volume data set and the gather map to create an intermediate rendered image;

creating a scatter map, which associates rendered pixels of the intermediate image with their correct position in the rendered image; and transforming the intermediate rendered image by permuting the intermediate image to a correct rendered image in the graphics processing unit using the scatter map.

* * * * *